US008767601B2

(12) United States Patent
Park (10) Patent No.: US 8,767,601 B2
(45) Date of Patent: Jul. 1, 2014

(54) METHOD OF ENHANCING U-APSD FOR LOW POWER WI-FI

(75) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 13/074,480

(22) Filed: Mar. 29, 2011

(65) Prior Publication Data

US 2012/0250597 A1 Oct. 4, 2012

(51) Int. Cl.
*H04W 52/02* (2009.01)
(52) U.S. Cl.
USPC .......................... 370/311; 370/318; 370/312
(58) Field of Classification Search
USPC .................................................. 370/311, 331
See application file for complete search history.

(56) References Cited

U.S. PATENT DOCUMENTS

| 2007/0201468 | A1* | 8/2007 | Jokela ........................... 370/390 |
| 2007/0259700 | A1 | 11/2007 | Meier et al. |
| 2008/0101320 | A1 | 5/2008 | Krahn et al. |
| 2009/0199037 | A1 | 8/2009 | Venkatesh et al. |
| 2010/0165973 | A1 | 7/2010 | Su et al. |
| 2010/0271995 | A1* | 10/2010 | Seok et al. ..................... 370/311 |
| 2011/0235562 | A1* | 9/2011 | Tong et al. ..................... 370/312 |

FOREIGN PATENT DOCUMENTS

| CN | 102740424 A | 10/2012 |
| JP | 2012209934 A | 10/2012 |
| WO | WO-2012134831 A3 | 10/2012 |

OTHER PUBLICATIONS

On the Distributed Power Saving Mechanisms of Wireless LANs 802.11 e U-APSD vs 802.11 Power Save Mode by Xavier , 2006.*
Perez-Costa et al., "On the Distributed Power Saving Mechanisms of Wireless Lans 802.11e U-APSD vs 802.11 Power Save Mode", Nov. 1, 2006, pp. 1-17.
"International Application Serial No. PCT/US2012/029346, International Preliminary Report on Patentability mailed Oct. 1, 2013", 6 pgs.
"International Application Serial No. PCT/US2012/029346, International Search Report mailed Oct. 12, 2012", 3 pgs.
"International Application Serial No. PCT/US2012/029346, Written Opinion mailed Oct. 12, 2012", 5 pgs.
"Japanese Application Serial No. 2012-011483, Office Action mailed Jan. 22, 2013", w/English translation, 6 pgs.
"Japanese Application Serial No. 2012-011483, Office Action mailed Oct. 22, 2013", w/English translation, 11 pgs.

(Continued)

*Primary Examiner* — Man Phan
*Assistant Examiner* — Pamit Kaur
(74) *Attorney, Agent, or Firm* — Schwegman, Lundberg & Woessner, P.A.

(57) ABSTRACT

A device for communicating in a wireless network, such as, for example, a non-AP STA, is adapted to send a trigger frame to an AP for group-addressed frames. In addition, an AP may be adapted to be triggered for group-addressed frames to deliver the group-addressed frame to a non-AP STA. The group-addressed frames could include data frames or management frames or both. Such a device or non-AP STA can advantageously stay in a power save mode until it is ready to wake up to send a trigger frame to the AP, and does not need to wake up at regular intervals, such as at every DTIM time interval, to listen for beacons from the AP and to receive any group-addressed frames destined for it and buffered at the AP. In this way, the battery life of the device may be extended.

27 Claims, 4 Drawing Sheets

(56) References Cited

OTHER PUBLICATIONS

"Japanese Application Serial No. 2012-011483, Response filed May 20, 2013 to Office Action mailed Jan. 22, 2013", w/English claims, 21 pgs.

Stephens, Adrian, "802.11 TGmb LB160 Power-saving buffered units", IEEE 802.11-10/0190r3,IEEE Mentor, Intel Corporation, (May 19, 2010), 25 pgs.

Thomson, Allan, "FMS Normative Text for D4.0 CIDs", IEEE 802.11-09/0144r2, IEEE Mentor, (Jan. 20, 2009), 7 pgs.

* cited by examiner

METHOD OF ENHANCING U-APSD FOR LOW POWER WI-FI

BACKGROUND

Within a wireless network, some wireless non-access point stations (non-AP STAs) may include high performing stations (STAs) such as laptops, etc, which are less constrained by battery life, and smaller battery powered non-AP STAs such as for example sensors, which need to last many years with small battery capacity. Non-AP STAs typically enter a power save (PS) mode when not needing to send or receive frames. The PS mode is especially important for the non-AP STAs with smaller batteries. To set the times when a non-AP STA needs to be awake, the IEEE 802.11e standard uses a procedure called Unscheduled Automatic Power Save Delivery (U-APSD). U-APSD allows a STA to be awake during a Service Period (SP). An unscheduled SP may begin when an AP receives a trigger frame, in the form of a QoS data or QoS Null frame, from a non-AP STA. Each of the four access categories (AC's) defined in EDCA, corresponding to AC_VO, AC_VI, AC_BE and AC_BK, can be configured separately to be trigger/delivery-enabled. The configuration is communicated by a non-AP STA for example in an association or re-association frame. The AP will then start buffering frames mapping to trigger enabled AC's, and will deliver them upon receiving a QoS trigger from the non-AP STA. However, the non-AP STA must wake up every DTIM time period in order to listen for beacons from an AP to determine if any group-addressed frames have been buffered for it by the AP. Waking up at DTIM time intervals however can further shorten the non-AP STA's battery life, especially in the case of a non-AP STA with a small battery.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

A "STA" may be embodied as a communication station, a mobile station, an advanced station, a client, a platform, a wireless communication device, a wireless AP, a modem, a wireless modem, a Personal Computer (PC), a desktop computer, a mobile computer, a laptop computer, a notebook computer, a tablet computer, a server computer, a set-top box, a handheld computer, a handheld device, a Personal Digital Assistant (PDA) device, a handheld PDA device, and/or a netbook, wireless sensor, a wireless headphone, a wireless camera, or other wireless-enabled devices. A "non-AP" STA refers to a STA that is not an AP.

Alternately or in combination, the STAs or platforms can use signals to communicate in a wireless network such as a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing Next Generation mmWave (NGmS-D02/r0, Nov. 28, 2008), Wireless Gigabit Alliance (WGA), IEEE 802.11, 802.11a, 802.11b, 802.11e, 802.11g, 802.11h, 802.11i, 802.11n, 802.11ac, 802.16, 802.16d, 802.16e, 802.11 ah standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Maximum Ratio Combining (MRC) transceiver or device, a transceiver or device having "smart antenna" technology or multiple antenna technology, or the like. A STA operating in accordance with these protocols and/or standards may require the implementation of at least two layers. One layer is the 802.11 MAC layer (i.e., OSI Data/Link Layer 2). Another layer is the 802.11 PHY layer (i.e., OSI Physical Layer 1). The MAC layer may be implemented using either or a combination of dedicated hardware and dedicated software. The PHY layer may be implemented using dedicated hardware or through software emulation.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments may be used in various other apparatuses, devices, systems and/or networks.

According to some embodiments, a device for communicating in a wireless network, such as, for example, a non-AP STA, is adapted to send a trigger frame to an AP for group-addressed frames. Thus, a non-AP STA may example be adapted to send a frame to an AP to trigger to AP to send group-addressed frames, such as buffered group-addressed frames, to the non-AP STA. The group-addressed frames could include data frames or management frames or both. Such a device can advantageously stay in a power save mode until it is ready to wake up to send a trigger frame to the AP, and does not need to wake up at regular intervals, such as at every DTIM time interval, to listen for beacons from the AP and to receive any group-addressed frames destined for it and buffered at the AP. In this way, the battery life of the device may be extended. According to some embodiments, an AP is adapted to be triggered for group-addressed frames to deliver the group-addressed frame to a non-AP STA. For example, according to the above schemes, a non-AP STA may communicate its ability to trigger the delivery of group-addressed frames by an AP by communicating an Extended U-APSD element to the AP, where the Extended U-APSD element includes an AC_GR. Additionally, an AP may communicate its ability to be triggered for group-addressed frames and to deliver group-addressed frames to a non-AP STA by communicating an Extended U-APSD element to the non-AP STA. The Extended U-APSD element may for example be communicated by the AP in a Beacon frame or in a Probe Response frame, and by the non-AP STA in an association or re-association frame. It is also possible for an AP to communicate its ability to support the proposed U-APSD scheme of embodiments by responding to a non-AP STA's association or re-association frame by including an Extended U-APSD element in its association or re-association response frame to the non-AP STA, for example where it may not have communicated such information to the non-AP STA previously. When the AC_GR subfield of the Extended U-APSD element is set to 1, and the Extended U-APSD element is sent by the AP, the Extended U-APSD element alerts the non-AP STA that the AP is adapted to be triggered to deliver group-addressed frames to the non-AP STA. When the AC_GR subfield is set to 1, and the Extended U-APSD element is sent by the non-AP STA, the Extended U-APSD element alerts the AP that the non-AP STA is adapted to trigger group-addressed frames to be delivered to it by the AP. The non-AP STA may for example trigger the delivery of group-addressed frames to it by an AP by sending a QoS Data or a QoS-Null Data frame to that AP.

In various embodiments, a non-AP STA in a wireless network may have at least two power modes, designated herein as an active mode, in which the device is awake, and the PS mode during which the non-AP STA is placed in a non-operational low-power condition. When the non-AP STA is in the active mode, the non-AP STA is fully functional and can always transmit and receive. In the PS mode, the STA may not transmit or receive.

Figure 1A:
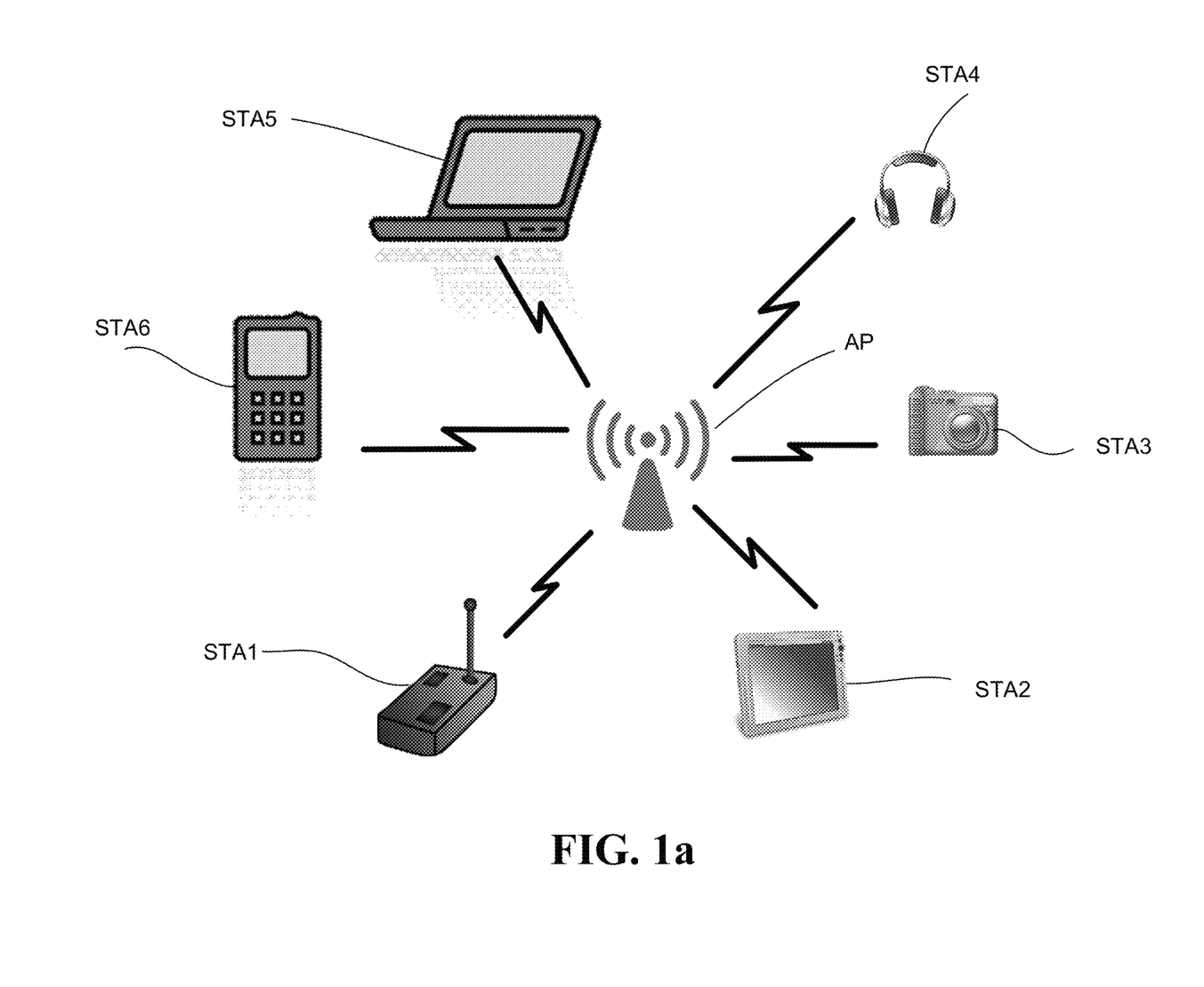
FIG. 1a is a schematic diagram of a wireless communications network, according to an embodiment.

FIG. 1a shows devices in a wireless communications network according to an embodiment. Each device may be assumed to contain at least one processor and at least one radio to facilitate wireless communications. The illustrated embodiment shows an AP as various other devices as the non-AP STAs (STA1-STA6) the communications for which are largely controlled by the AP. Although specific types of devices are shown (e.g. STA1 as a sensor, STA2 as a display, STA3 as a camera, STA4 as a set of headphone, STA5 as a laptop computer, and STA6 as a smartphone) these are used only as examples of typical wireless devices that may operate on smaller batteries (STA1-STA4) or on larger batteries such as lithium-ion batteries (STA5 and STA6), although operations described herein might also be used on devices that plug into external power sources as an energy saving measure. For example, the use of embodiments for plugged-in devices could advantageously reduce re-association times as well as power consumption, since the re-association could take a relatively long time and increase latency.

Figure 1B:
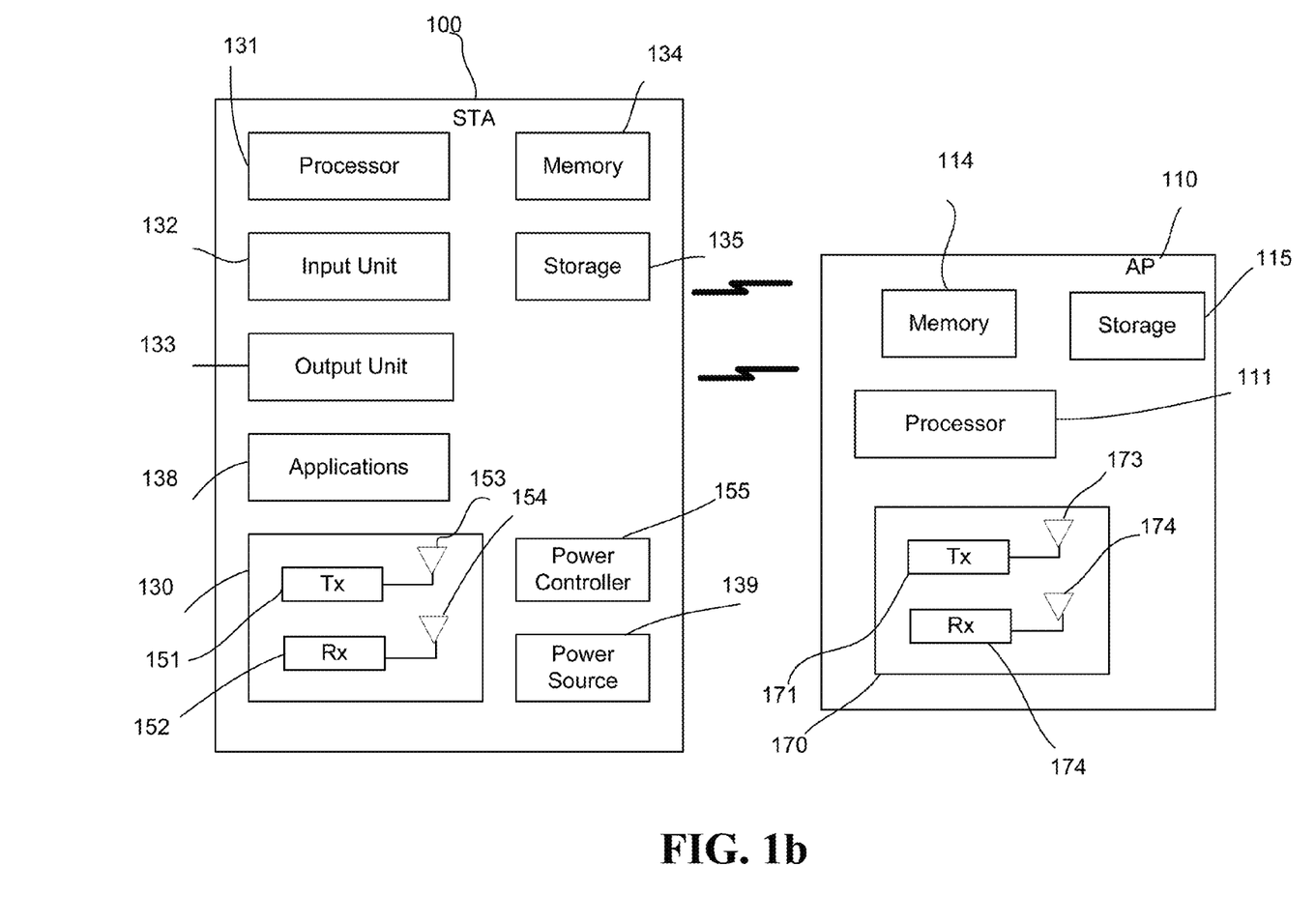
FIG. 1b is a schematic diagram of a STA and of an AP according to an embodiment.

Referring next to FIG. 1b, a non-AP STA 100, such as any of the non-AP STAs of FIG. 1a, may include, for example, a processor 131, an input unit 132, an output unit 133, a memory unit 134, a storage unit 135, a communication unit 150, a power controller 155, and a power source 139, which may comprise a battery. Non-AP STA 100 may optionally include other suitable hardware or software components. Input Unit 132 includes, for example, a keyboard, a keypad, a mouse, a touch-pad, a track-ball, a stylus, a microphone, or other suitable pointing device or input device. Output unit 133 includes, for example, a monitor, a screen, a Cathode Ray Tube (CRT) display unit, a Liquid Crystal Display (LCD) display unit, a plasma display unit, one or more audio speakers or earphones, or other suitable output devices. Memory unit 134 may store data processed by non-AP STA 100. Communication unit 150 includes, for example, a wireless transceiver, a wireless modem, a wireless Network Interface Card (NIC), or the like. For example, communication unit 150 includes a transmitter 151 and a receiver 152. Transmitter 151 includes, for example, a wireless Radio Frequency (RF) transmitter able to transmit wireless RF signals, blocks, frames, transmission streams, packets, messages and/or data, e.g., through an antenna 153. Receiver 152 includes, for example, a wireless Radio Frequency (RF) receiver able to receive wireless RF signals, blocks, frames, transmission streams, packets, messages and/or data, e.g., through an antenna 154. Optionally, transmitter 151 and receiver 152 may be implemented using a transceiver, a transmitter-receiver, or other suitable components. Optionally, antenna 153 and antenna 154 may be implemented using a common antenna, a common set of multiple antennas, or other suitable component(s). For example, antenna 153 and/or antenna 154 may include an internal and/or external RF antenna, a dipole antenna, a monopole antenna, an omni-directional antenna, an end fed antenna, a circularly polarized antenna, a microstrip antenna, a diversity antenna, or other type of antenna suitable for transmitting and/or receiving wireless communication signals, blocks, frames, transmission streams, packets, messages and/or data. Power source 139 includes, for example, one or more batteries, rechargeable batteries, non-rechargeable batteries, replaceable batteries, disposable or non-replaceable batteries, internal batteries, external batteries, or other power cells able to provide electric power to one or more components of non-AP STA 100.

Optionally, a power controller 155 is able to modify operational properties of STA 100 (or components thereof) based on power-related algorithms or criteria. For example, power controller 155 is able to turn off, turn on, enable, disable, connect and/or disconnect one or more components of STA 100 and is able to command non-AP STA 100 or components thereof to go into a power-saving mode.

AP 110 may be or may include, for example, a processor 111, a memory unit 114, a storage unit 115, and a communication unit 170. The communication unit 170 may include, for example, a transmitter 171 associated with an antenna 173, and a receiver 172 associated with an antenna 174. Like devices as between AP 110 and non-AP STA 100 may be similar in properties or functionality as described above with respect to components of non-AP STA 100.

In some embodiments, some or all of the components of non-AP STA 100 and/or of AP 110 may be enclosed in a common housing, packaging, or, the like, and may be interconnected or operably associated using one or more wired or wireless links. In other embodiments, components of non-AP STA 100 and/or of AP 110 may be distributed among multiple or separate devices or locations.

Figure 2:
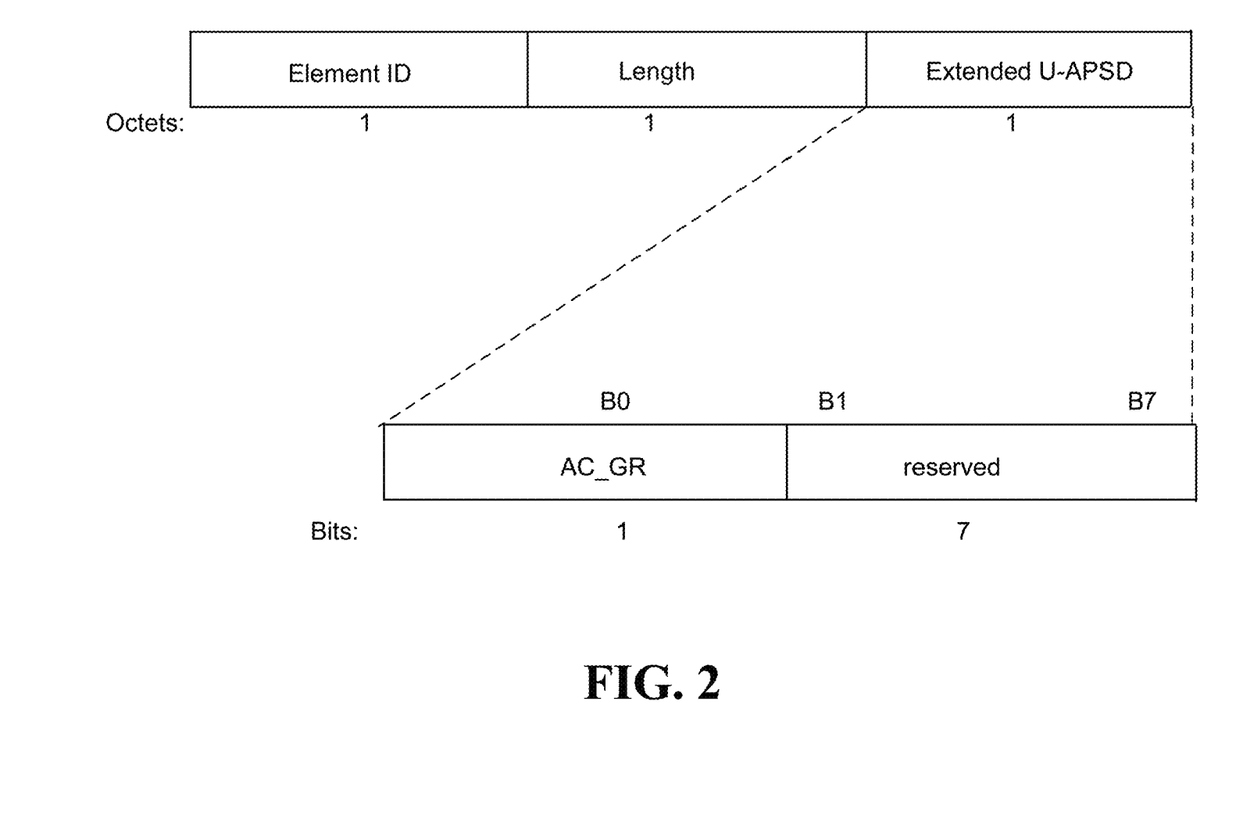
FIG. 2 is a schematic depiction of a U-APSD element according to an embodiment.

Referring now to FIG. 2, a schematic depiction of an Extended U-APSD element is shown. The Extended U-APSD element may include an Access Category_Group Addressed Frames (AC_GR frames) subfield. In the shown embodiment, the AC_GR frame is one bit in length, although it could be longer. The presence of the AC_GR subfield indicates that an access category has been assigned to group-addressed frames in a U-APSD mechanism. The U-APSD element according to some embodiments may thus be used in two ways: (1) by an AP to convey information to a non-AP STA regarding whether the AP is adapted to support a trigger/delivery-enabled AC_GR category; and (2) by a non-AP STA to convey information to an AP among others as to whether the non-AP STA is adapted to send trigger frames to an AP to trigger the same to deliver group-addressed frames to the non-AP. An "element" as used herein refers to a portion of a BSS communication frame, that is, a portion of a block of communication protocol within a BSS. The illustrated embodiment of a U-APSD element suggests specific fields devoted to specific purposes occurring within discrete time periods. Other embodiments may use more, fewer or different time periods with different fields and/or purposes. In the embodiment shown, the first field corresponds to an Element ID field, which may comprise a fixed value identified in the U-APSD element signaling that the element is a U-APSD element. Following the Element ID field may be a Length field, which conveys information regarding the length of the field that follows, that is, the length of the Extended U-APSD field. The Extended U-APSD field in turn may include subfields representing information among other things regarding whether the AC_GR is trigger and delivery enabled. When the non-AP STA, such as non-AP STA 100 of FIG. 1*b* for example, or such as STA1-STA4 of FIG. 1*a*, sends a Extended U-APSD element to an AP including the AC_GR subfield set to 1, it means that the non-AP STA is U-APSD enabled with respect to group addressed frames, that is, that the group addressed frames are trigger- and delivery-enabled with respect to the non-AP STA. If the AC_GR subfield is set to 0, on the other hand, it means that the non-AP STA is not enabled with respect to group-addressed frames, that is, that the group addressed frames are neither trigger-nor delivery-enabled, as a result of which the non-AP STA can remain in the power save mode only within DTIM intervals, thus resulting in a shorter battery life for the non-AP STA. When the AP, such as AP 110 of FIG. 1*b* for example, or such as the AP of FIG. 1*a*, sends a Extended U-APSD element to an non-AP STA including the AC_GR subfield set to 1, it means that the AP U-APSD enabled with respect to group addressed frames, that is, that the group addressed frames are trigger- and delivery-enabled with respect to the AP. If the AC_GR subfield is set to 0, on the other hand, it means that the AP is not enabled with respect to group-addressed frames, that is, that the group addressed frames are neither trigger-nor delivery-enabled with respect to the AP. If the AC_GR of the AP is set to 0, the non-AP STA may remain in the power save mode only between DTIM time intervals, thus resulting in a shorter battery life for the non-AP STA. A power controller of the non-AP STA, for example similar for example to non-AP STA 100 of FIG. 1*b* including power controller 155, may be adapted to control the power states of the non-AP STA based on the Extended U-APSD element.

In operation, if an AP supports a group-addressed frame trigger/delivery mode as described above, it may include the Extended U-APSD element in Beacon frames or in Probe Response frames. If there is no Extended U-APSD element sent by the AP, then the non-AP STA would know that the AP does not support the triggering of group-addressed frames. A non-AP STA that wishes to trigger the AP for group-addressed frames can set the AC_GR subfield in the Extended U-APSD element to 1, and include the Extended U-APSD element in an association frame or a re-association frame to the AP. When the AP then receives the Extended U-APSD element with the AC_GR bit set to 1, if the AP supports the Extended U-APSD regime described and if the AC_GR of the AP was also set to 1, it will buffer the group-addressed frames for the non-AP STA until it receives trigger frames. Thus, the non-AP STA may remain in a PS mode for a long period of time without having to wake up at every DTIM interval, and at the same time not lose any group-addressed frames. When the non-AP STA wakes up, for example to determine whether there are any packets buffered for it at the AP, it may send a QoS Data (if it has data to send to the AP), or a QoS Null Data frame (if it has no data to send to the AP but wishes to request delivery of buffered frames from the AP) to the AP in order to trigger delivery of group-addressed frames. Upon receiving the trigger frame from the non-AP STA, the AP may then deliver the buffered group-addressed frames to the non-AP STA. In addition, the AP may send any buffered unicast frames to the non-AP STA along with the group-addressed frames. However, if the AP sets the AC_GR to 0, that means that it will not be able to be triggered by a non-AP STA to deliver group-addressed frames to STA. Thus, if the AC_GR bit is set to 0, the AP will use the legacy group addressed frame delivery mechanism which would involve delivery group-addressed frames after DTIM beacons. Under such circumstances, the non-AP STA may thus wake up every DTIM time interval according to the state of the art in order to have any group-addressed frames delivered to it. Regardless of the above, when a non-AP STA is in an active mode, group-addressed frames may be directly delivered to a non-AP STA without needing to be buffered.

For an AP that does not support the Extended U-APSD element, it is up to the non-AP STA to decide what to do next. For example, if the AP's Beacon frame or Probe Response frame does not include a Extended U-APSD element, then the non-AP STA will know that U-APSD will not be supported for group-addressed frames. In such a case, the non-AP STA will not be sending an Extended U-APSD element with AC_GR set to 1. If the STA really needs to be able to trigger U-APSD for AC_GR, it may try to find another AP that can support the same and that will have its AC_GR set to 1. The STA may also just associate to the original AP and wake up every DTIM to receive group-addressed frames, knowing that the non-AP STA will not have the expected battery life. In addition, should the non-AP STA move to a new AP while in a PS mode, if the original AP that sent the Extended U-APSD element and the new AP are both managed by a common controller, then the Extended U-APSD element for the STA may be stored across AP's managed by the controller. In such a case, if the non-AP STA moves, it may not need to re-associate with the AP and still maintain the U-APSD regime for AC_GR set with the original AP.

An AP according to an embodiment may be adapted to accommodate both a non-AP STA that cannot and a STA that can support U-APSD for AC_GR. In this way, a wireless network may be able to advantageously accommodate different types of non-AP STAs, including sending group-addressed frames either by way of trigger frames or at every DTIM interval.

Advantageously, embodiments allow the non-AP STAs with small battery capacity, such as, for example, a non-AP STA with a battery capacity roughly from about 200 mAh (such as a coin-cell battery) to about 3000 mAh (such as a Lithium AA battery), to be able to trigger group-addressed frames for delivery by an AP without needing to wake up every DTIM interval in order to receive those group-addressed frames. As a result, the non-AP STA may have a longer battery life than would have been possible under the state-of-the-art U-APSD regime.****

Figure 3:
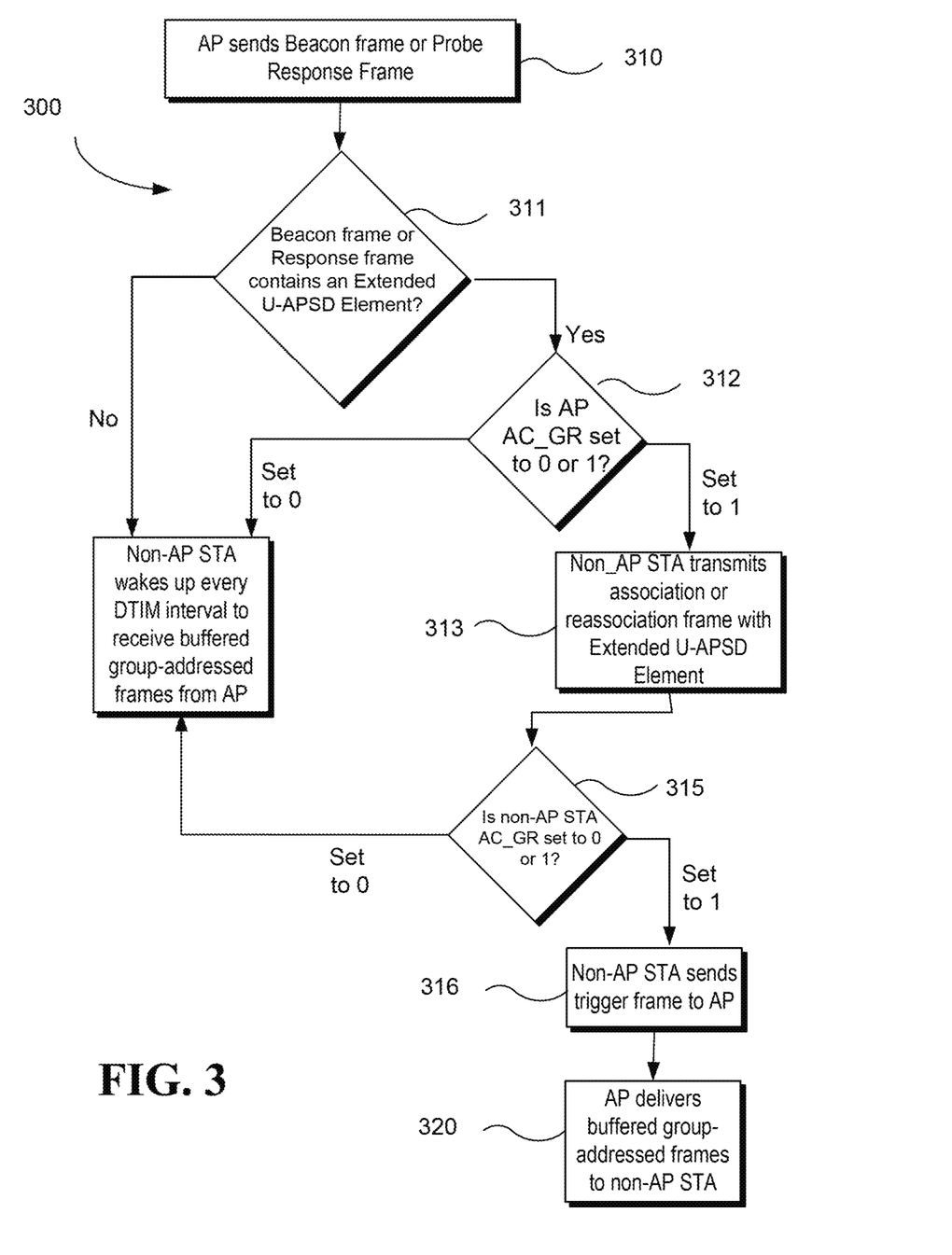
FIG. 3 is a flow-chart of a method of power saving in wireless network in accordance with an embodiment.

Referring now to FIG. 3, an exemplary schematic depiction is made in flowchart form of a method embodiment. In flow diagram 300, at 310 an AP may send a Beacon frame or a Probe Response frame to a non-AP STA. The non-AP STA determines at 311 whether the Beacon frame or Probe Response frame contains an Extended U-APSD Element. If yes, at 312, the non-AP STA determines whether the AC_GR in the AP's EUE is set to 0 or to 1.

Referring still to FIG. 3, if the AC_GR of the AP is set to 1, at 313 the non-AP STA may transmit an association or re-association frame including a Extended U-APSD element for the non-AP STA to the AP. An AP may receive that frame at 315 and determine whether AC_GR of the non-AP STA is set to 1 or 0. If AC_GR is set to 1, the non-AP STA may awaken at 316 to send a trigger frame (e.g. a QoS Data or QoS Null Data frame) to the AP, and, the AP may be triggered at 320 to deliver any buffered group-addressed frames to the non-AP STA upon receiving the trigger frame from the non-AP STA. If the AC_GR is set to 0, the non-AP STA may at 322 wake up every DTIM interval, and the AP may send any buffered group-addressed frames to the non-AP STA at every DTIM interval.

Referring still to FIG. 3, if the AC_GR of the AP is set to 0, this means that the AP's group-addressed frames cannot be trigger/delivery enabled. Thus, if the AC_GR bit is set to 0, the AP will use the legacy group addressed frame delivery mechanism which would involve delivery group-addressed frames after DTIM beacons. Under such circumstances, the non-AP STA may thus at 322 wake up every DTIM interval, and the AP may send any buffered group-addressed frames to the non-AP STA at every DTIM interval.

Referring still to FIG. 3, if the Beacon frame or Probe response frame do not contain a Extended U-APSD Element, that is, if the AP cannot support trigger/delivery enabled AC_GR frames, at block 330, the non-AP STA may try to find another AP that can support the same, or at 335, the non-AP STA may also just associate to the original AP. In the case of the latter, the non-AP STA may need to wake up every DTIM to receive group-addressed frames, knowing that the non-AP STA will not have the expected battery life.

With respect to embodiments and to FIG. 3, if there are no buffered group-addressed frames destined for the non-AP STA when it awakes under either the U-APSD regime including a Extended U-APSD element or under a state of the art U-APSD regime, then a sending of the trigger frame will of course not result in a triggering or buffered group-addressed frames. However, if the non-AP STA is awake, non-buffered group-addressed frames may still be directly delivered to it.

The foregoing description is intended to be illustrative and not limiting. Variations will occur to those of skill in the art. Those variations are intended to be included in the various embodiments of the invention, which are limited only by the scope of the following claims.

What is claimed is:

1. A device for communicating in a wireless network, the device comprising a processor, a memory, and a radio, wherein the device is configured to
send a trigger frame to an access point for group-addressed frames, and
communicate an Extended U-APSD (Unscheduled-Automatic Power Save Delivery) element to the access point including an AC_GR (Access Category_Group Accessed) subfield, which, when set to a value, alerts the access point that the device is configured to send the trigger frame.

2. The device of claim 1, wherein the device is to send the trigger frame for the group-addressed frames and for any unicast frames at the same time.

3. The device of claim 1, wherein the device is to communicate the Extended U-APSD element to the access point in an association and/or a re-association frame.

4. The device of claim 1, wherein the device is configured to send the trigger frame to by sending a QoS-Data or a QoS-Null Data frame.

5. A wireless access point for communicating in a wireless network, the wireless access point comprising a processor, a memory, and a radio, wherein the access point is to
receive a trigger frame for group-addressed frames to deliver the group-addressed frames to a non-AP STA, and
receive an Extended U-APSD (Unscheduled-Automatic Power Save Delivery) element element from the non-AP STA (non-Access Point Station) including an AC_GR (Access Category_Group Accessed) subfield, which, when set to a value, alerts the access point that the non-AP STA is configured to send the trigger frame.

6. The access point of claim 5, wherein the access point is to deliver the group-addressed frames and any unicast frames at the same time.

7. The access point of claim 5, wherein the access point is to receive the Extended U-APSD element from the non-AP STA in an association and/or a re-association frame.

8. The access point of claim 5, wherein the access point is to communicate an Extended U-APSD element to the non-AP STA including an AC_GR subfield, which, when set to 1, alerts the non-AP STA that the access point is adapted to be triggered for group-addressed frames for delivery to the non-AP STA.

9. The access point of claim 8, wherein the access point is to send the Extended U-APSD element in a Beacon frame or a Probe response frame.

10. A method of communicating in a wireless network, the method comprising
sending a trigger frame to an access point for group-addressed frames for delivery to a non-AP STA (non-Access Point Station); and
communicating an Extended U-APSD (Unscheduled-Automatic Power Save Delivery) element to the access point including an AC_GR (Access Category_Group Accessed) subfield, which, when set to a value, alerts the access point that the non-AP STA is configured to send the trigger frame.

11. The method of claim 10, further comprising receiving the group-addressed frames and any unicast frames at the same time.

12. The method of claim 10, wherein communicating includes communicating the Extended U-APSD element to the access point in an association and/or a re-association frame.

13. The method of claim 11, wherein sending a trigger frame includes sending a QoS-Data or a QoS-Null Data frame.

14. A method for communicating in a wireless network, comprising
delivering group-addressed frames to a non-AP STA (non-Access Point Station) in response to a trigger frame for the group-addressed frames by the non-AP STA; and
receiving an Extended U-APSD (Unscheduled-Automatic Power Save Delivery) element from the non-AP STA including an AC_GR (Access Category_Group Accessed) subfield, which, when set to a value, signifies that the non-AP STA is configured to send the trigger frame.

15. The method of claim 14, wherein delivering includes delivering the group-addressed frames and any unicast frames at the same time.

16. The method of claim 14, wherein receiving includes receiving the Extended U-APSD element from the non-AP STA in an association and/or a re-association frame.

17. The method of claim 14, further including communicating an Extended U-APSD element to the non-AP STA including an AC_GR subfield, which, when set to 1, alerts the non-AP STA that a triggering and a delivery of the group-addressed frames are supported.

18. The method of claim 17, wherein communicating includes communicating the Extended U-APSD element in a Beacon frame or a Probe Response frame.

19. An article comprising a non transitory computer readable medium that contains instructions, which when executed by one or more processors, result in performing operations comprising
sending a trigger frame to an access point for group-addressed frames for delivery to a non-AP STA (non-Access Point Station); and
communicating an Extended U-APSD (Unscheduled-Automatic Power Save Delivery) element to the access point including an AC_GR (Access Category_Group Accessed) subfield, which, when set to a value, alerts the access point that the non-AP STA is configured to send the trigger frame.

20. The article of claim 19, wherein the operations further comprise receiving the group-addressed frames and any unicast frames at the same time.

21. The article of claim 19, wherein communicating includes communicating the Extended U-APSD element to the access point in an association and/or a re-association frame.

22. The article of claim 19, wherein triggering includes sending a QoS-Data or a QoS-Null Data frame to the access point.

23. An article comprising a non transitory computer readable medium that contains instructions, which when executed by one or more processors, result in performing operations comprising
delivering group-addressed frames to a non-AP STA (non-Access Point Station) in response to a trigger frame for the group-addressed frames by the non-AP STA; and
receiving an Extended U-APSD (Unscheduled-Automatic Power Save Delivery) element from the non-AP STA including an AC_GR (Access Category_Group Accessed) subfield, which, when set to a value, signifies that the non-AP STA is configured to send the trigger frame.

24. The article of claim 23, wherein delivering includes delivering the group-addressed frames and any unicast frames at the same time.

25. The article of claim 23, wherein receiving includes receiving the Extended U-APSD element from the non-AP STA in an association and/or a re-association frame.

26. The article of claim 23, wherein the operations further comprise communicating an Extended U-APSD element to the non-AP STA including an AC_GR subfield, which, when set to 1, alerts the non-AP STA that a triggering and a delivery of the group-addressed frames are supported.

27. The article of claim 26, wherein communicating comprises communicating the Extended U-APSD element in a Beacon frame or Probe Response frame.

* * * * *

UNITED STATES PATENT AND TRADEMARK OFFICE
CERTIFICATE OF CORRECTION

| | | |
|---|---|---|
| PATENT NO. | : 8,767,601 B2 | Page 1 of 1 |
| APPLICATION NO. | : 13/074480 | |
| DATED | : July 1, 2014 | |
| INVENTOR(S) | : Minyoung Park | |

It is certified that error appears in the above-identified patent and that said Letters Patent is hereby corrected as shown below:

IN THE CLAIMS:

In column 8, line 51, in Claim 5, before "from", delete "element", therefor

Signed and Sealed this
Thirtieth Day of December, 2014

Michelle K. Lee
*Deputy Director of the United States Patent and Trademark Office*